(12) United States Patent
Yang et al.

(10) Patent No.: US 11,831,201 B2
(45) Date of Patent: Nov. 28, 2023

(54) MOTOR WITH SPLIT CORE STATOR WITH TWO SUPPORT RINGS

(71) Applicant: HYUNDAI MOBIS Co., Ltd., Seoul (KR)

(72) Inventors: Hye Seong Yang, Yongin-si (KR); Yeong Woo Seo, Yongin-si (KR); Hyun Ho Park, Yongin-si (KR); Jung Kyu Yim, Yongin-si (KR); Seong Jun Hwang, Yongin-si (KR); Yul Kyu Son, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/481,754

(22) Filed: Sep. 22, 2021

(65) Prior Publication Data

US 2022/0094219 A1    Mar. 24, 2022

(30) Foreign Application Priority Data

Sep. 23, 2020   (KR) .......................... 10-2020-0123237

(51) Int. Cl.
*H02K 1/14* (2006.01)
*H02K 1/18* (2006.01)

(52) U.S. Cl.
CPC ............. *H02K 1/185* (2013.01); *H02K 1/148* (2013.01)

(58) Field of Classification Search
CPC .......... H02K 1/185; H02K 1/18; H02K 1/182; H02K 1/148; H02K 5/04; H02K 5/24; H02K 7/09; F16C 32/047

USPC ........... 310/89, 415, 431–433, 427, 216.127, 310/216.129, 216.114
See application file for complete search history.

(56) References Cited

U.S. PATENT DOCUMENTS

| | | | | |
|---|---|---|---|---|
| 493,337 | A * | 3/1893 | Parshall ................. | H02K 15/12 310/265 |
| 1,771,475 | A * | 7/1930 | Wright ................... | H02K 1/185 310/407 |
| 1,795,882 | A * | 3/1931 | Noden .................... | H02K 1/185 310/216.049 |
| 1,822,096 | A * | 9/1931 | Hollander .............. | H02K 1/185 310/426 |
| 2,001,799 | A * | 5/1935 | Seyfried ................ | H02K 1/185 310/414 |
| 2,011,060 | A * | 8/1935 | Leland ................... | H02K 1/185 310/216.135 |

(Continued)

FOREIGN PATENT DOCUMENTS

| | | | | |
|---|---|---|---|---|
| JP | 2006345636 | A * | 12/2006 | ............. H02K 1/185 |
| WO | WO-2012095987 | A1 * | 7/2012 | ............. H02K 1/148 |
| WO | WO-2017126297 | A1 * | 7/2017 | |

OTHER PUBLICATIONS

JP-2006345636-A Engish Translation.*
WO-2017126297-A1 English Translation.*
WO-2012095987-A1 English Translation.*

*Primary Examiner* — Maged M Almawri
(74) *Attorney, Agent, or Firm* — Morgan, Lewis & Bockius LLP

(57) ABSTRACT

The present disclosure relates to a motor including: a stator including a plurality of split cores configured to cooperatively define a ring shape; and support rings configured to surround outer circumferential surfaces of the split cores and to support upper and lower surfaces of the split cores, thereby improving stability and reliability.

13 Claims, 10 Drawing Sheets

(56) References Cited

U.S. PATENT DOCUMENTS

| | | | | |
|---|---|---|---|---|
| 2,023,259 A * | 12/1935 | Anderson | H02K 1/185 | 310/426 |
| 2,251,674 A * | 8/1941 | Gillen | H02K 17/10 | 310/216.049 |
| 2,478,316 A * | 8/1949 | Potter | H02K 1/185 | 310/216.127 |
| 2,523,520 A * | 9/1950 | Reinhard | H02K 1/185 | 310/410 |
| 2,689,394 A * | 9/1954 | Bentjens | B23C 5/2295 | 407/51 |
| 2,711,492 A * | 6/1955 | Ballman | H02K 1/185 | 164/109 |
| 2,876,371 A * | 3/1959 | Wesolowski | H02K 1/16 | 310/216.049 |
| 2,939,021 A * | 5/1960 | Gilchrist | H02K 1/185 | 310/91 |
| 2,977,491 A * | 3/1961 | Hueffed | H02K 1/185 | 310/414 |
| 4,227,109 A * | 10/1980 | Mulach | H02K 1/16 | 310/216.049 |
| 4,286,187 A * | 8/1981 | Binder | H02K 7/1815 | 310/90 |
| 4,603,273 A * | 7/1986 | McDonald | H02K 15/16 | 310/90 |
| 4,642,502 A * | 2/1987 | Carpenter | H02K 1/278 | 310/216.013 |
| 4,765,054 A * | 8/1988 | Sauerwein | H02K 3/522 | 310/216.115 |
| 4,797,602 A * | 1/1989 | West | H02K 11/048 | 310/156.28 |
| 4,972,113 A * | 11/1990 | Newberg | H02K 15/16 | 310/410 |
| 5,015,904 A * | 5/1991 | Kleemann | H02K 3/325 | 310/194 |
| 5,319,270 A * | 6/1994 | Tanaka | H02K 11/21 | 310/216.096 |
| 5,430,338 A * | 7/1995 | McMillan | H02K 5/15 | 310/91 |
| 5,742,991 A * | 4/1998 | Kurth | B29C 45/1747 | 425/589 |
| 5,793,136 A * | 8/1998 | Redzic | H02K 16/02 | 310/112 |
| 5,796,190 A * | 8/1998 | Takeda | H02K 7/1815 | 310/156.31 |
| 5,818,131 A * | 10/1998 | Zhang | F04D 13/0646 | 310/90.5 |
| 5,821,647 A * | 10/1998 | Takehara | H02K 7/14 | 310/90 |
| 5,850,679 A * | 12/1998 | Hoffman | B25B 27/026 | 29/252 |
| 5,949,169 A * | 9/1999 | Niimi | H02K 23/04 | 310/216.127 |
| 6,040,645 A * | 3/2000 | Lynch | H02K 23/54 | 310/227 |
| 6,124,567 A * | 9/2000 | Feldhausen | B23K 9/1006 | 310/52 |
| 6,225,722 B1 * | 5/2001 | Rupp | H02K 21/22 | 310/91 |
| 6,305,989 B1 * | 10/2001 | Quadir | H01R 13/533 | 439/685 |
| 6,310,320 B1 * | 10/2001 | Kraus | B23K 9/1075 | 219/133 |
| 6,317,963 B1 * | 11/2001 | Powers | H02K 15/14 | 310/58 |
| 6,320,287 B1 * | 11/2001 | Watson | H02K 1/185 | 310/91 |
| 6,346,760 B1 * | 2/2002 | Boardman, IV | H02K 1/16 | 310/216.118 |
| 6,498,417 B2 * | 12/2002 | Fuller | H02K 1/185 | 310/431 |
| 6,589,018 B2 * | 7/2003 | Chen | F04D 29/263 | 310/71 |
| 6,713,930 B2 * | 3/2004 | Shah | H02K 1/185 | 310/216.076 |
| 6,720,699 B1 * | 4/2004 | Shah | H02K 1/16 | 310/182 |
| 6,737,775 B2 * | 5/2004 | Hatz | H02K 7/1815 | 322/4 |
| 6,796,021 B2 * | 9/2004 | Fuller | H02K 15/00 | 310/91 |
| 6,856,064 B2 * | 2/2005 | Masumoto | H02K 15/024 | 310/216.008 |
| 6,866,487 B2 * | 3/2005 | Abe | F04C 18/0215 | 417/410.5 |
| 6,933,640 B2 * | 8/2005 | Schurter | H02K 1/185 | 310/85 |
| 6,960,861 B2 * | 11/2005 | Yoneda | H02K 1/148 | 310/216.012 |
| 6,979,930 B2 * | 12/2005 | Harada | H02K 1/16 | 310/216.004 |
| 7,397,163 B2 * | 7/2008 | Cook | H02K 1/187 | 310/427 |
| 7,471,000 B1 * | 12/2008 | Ruiz | H02J 7/1415 | 320/105 |
| 7,560,838 B2 * | 7/2009 | van der Woude | F02C 7/32 | 310/64 |
| 7,583,001 B2 * | 9/2009 | Lu | H02K 1/148 | 310/67 R |
| 7,653,986 B2 * | 2/2010 | Majernik | H02K 1/185 | 29/598 |
| 7,687,952 B2 * | 3/2010 | York | H02K 1/28 | 310/263 |
| 7,687,954 B2 * | 3/2010 | Neet | H02K 19/24 | 310/263 |
| 7,827,668 B2 * | 11/2010 | McKee | E21B 17/02 | 29/515 |
| 7,847,444 B2 * | 12/2010 | Kingman | H02K 5/203 | 310/91 |
| 7,868,509 B2 * | 1/2011 | Yoshino | H02K 1/16 | 310/216.131 |
| 7,919,898 B2 * | 4/2011 | Wang | H02K 1/276 | 310/216.127 |
| 7,928,617 B2 * | 4/2011 | Tsukashima | H02K 7/20 | 310/51 |
| 7,937,823 B2 * | 5/2011 | Alfermann | H02K 15/022 | 310/216.008 |
| 8,138,649 B2 * | 3/2012 | Bradfield | H02K 21/044 | 310/156.19 |
| 8,487,502 B2 * | 7/2013 | Kaiser | H02K 1/16 | 310/216.049 |
| 8,587,165 B2 * | 11/2013 | Zahora | H02K 9/06 | 310/58 |
| 8,643,246 B2 * | 2/2014 | Allen | H02K 1/18 | 310/216.029 |
| 8,829,743 B2 * | 9/2014 | Watanabe | H02K 9/19 | 310/60 A |
| 8,941,282 B2 * | 1/2015 | Allen | H02K 1/18 | 310/216.049 |
| 9,136,746 B2 * | 9/2015 | Ikuta | H02K 1/148 | |
| 9,263,921 B2 * | 2/2016 | Tanavde | H02K 1/16 | |
| 9,287,741 B2 * | 3/2016 | Nobata | H02K 15/14 | |
| 9,496,765 B2 * | 11/2016 | Zheng | H02K 5/24 | |
| 9,509,182 B2 * | 11/2016 | Yamarthi | H02K 1/185 | |
| 10,075,047 B2 * | 9/2018 | Zhou | H02K 5/207 | |
| 10,177,631 B1 * | 1/2019 | Hopkins | H02K 1/272 | |
| 10,393,082 B2 * | 8/2019 | Ihde | H02J 7/1415 | |
| 10,483,817 B2 * | 11/2019 | Sakurai | H02K 1/28 | |
| 10,673,289 B2 * | 6/2020 | Nakagawa | D06F 37/304 | |
| 10,840,773 B2 * | 11/2020 | Takano | H02K 9/227 | |
| 10,907,627 B2 * | 2/2021 | Ihde | F04B 17/03 | |
| 11,286,956 B2 * | 3/2022 | Kajikawa | H02K 7/14 | |
| 2001/0038797 A1 * | 11/2001 | Makino | H02K 7/14 | 417/410.3 |
| 2003/0184182 A1 * | 10/2003 | Smith, Jr. | H02K 15/022 | 310/216.084 |
| 2003/0214197 A1 * | 11/2003 | De Luca | H02K 1/148 | 310/216.084 |

(56) References Cited

U.S. PATENT DOCUMENTS

| | | | | |
|---|---|---|---|---|
| 2004/0217669 A1* | 11/2004 | Fujii | ................... | H02K 1/148 310/216.045 |
| 2005/0034295 A1* | 2/2005 | Meacham | ................ | H02K 1/02 29/598 |
| 2005/0189837 A1* | 9/2005 | Lee | ....................... | H02K 3/522 310/215 |
| 2006/0071574 A1* | 4/2006 | Stewart | .................. | H02K 1/146 310/216.132 |
| 2006/0279160 A1* | 12/2006 | Yoshinaga | ............ | H02K 1/148 310/216.049 |
| 2009/0085415 A1* | 4/2009 | Ionel | ..................... | H02K 1/148 310/43 |
| 2009/0212654 A1* | 8/2009 | Kaneiwa | ................. | H02K 3/50 310/214 |
| 2009/0289522 A1* | 11/2009 | Buban | ................... | H02K 1/148 310/216.113 |
| 2010/0021321 A1* | 1/2010 | Koike | ................ | F04B 39/0044 310/216.136 |
| 2010/0135830 A1* | 6/2010 | Yasuda | .................. | H02K 1/146 310/216.069 |
| 2010/0148620 A1* | 6/2010 | Ishizuka | ................ | H02K 3/12 310/201 |
| 2010/0270887 A1* | 10/2010 | Ishizuka | ................ | H02K 3/50 310/214 |
| 2010/0308687 A1* | 12/2010 | George | .................. | H02K 1/185 310/216.135 |
| 2011/0121680 A1* | 5/2011 | Boardman, IV | ....... | H02K 1/185 310/216.129 |
| 2012/0001515 A1* | 1/2012 | Kudose | ................... | H02K 1/16 310/216.009 |
| 2012/0153749 A1* | 6/2012 | Chun | ..................... | H02K 1/185 310/59 |
| 2012/0169173 A1* | 7/2012 | Jang | ...................... | H02K 3/345 310/215 |
| 2012/0206009 A1* | 8/2012 | Jang | ...................... | H02K 3/522 310/179 |
| 2013/0089428 A1* | 4/2013 | Hottier | .................... | F01D 5/00 416/223 R |
| 2013/0106252 A1* | 5/2013 | Yanagida | ............. | H02K 11/225 310/68 B |
| 2013/0140939 A1* | 6/2013 | Asaga | ................... | H02K 15/02 29/598 |
| 2013/0187517 A1* | 7/2013 | Asao | ....................... | H02K 5/04 310/68 D |
| 2013/0313922 A1* | 11/2013 | Kim | ....................... | H02K 3/522 310/44 |
| 2014/0197715 A1* | 7/2014 | Roopnarine | ............ | H02K 9/02 310/216.106 |
| 2014/0210284 A1* | 7/2014 | Banba | ................... | H02K 1/185 310/43 |
| 2014/0231483 A1* | 8/2014 | Takaichi | ................... | B26F 3/00 225/105 |
| 2014/0265683 A1* | 9/2014 | Hossain | ................ | H02K 15/14 310/89 |
| 2014/0354107 A1* | 12/2014 | Alfermann | ............ | H02K 15/14 310/216.113 |
| 2014/0360334 A1* | 12/2014 | Singer-Schnoeller | .... | F16B 7/18 29/428 |
| 2015/0000114 A1* | 1/2015 | Matsushita | ............ | H02K 15/03 29/729 |
| 2015/0022051 A1* | 1/2015 | Meng | ................. | B29C 45/0001 524/514 |
| 2015/0069865 A1* | 3/2015 | Alfermann | ............... | H02K 9/19 310/54 |
| 2015/0143691 A1* | 5/2015 | Takaichi | ................ | H02K 15/03 29/738 |
| 2015/0222151 A1* | 8/2015 | Semken | ................ | H02K 1/278 29/452 |
| 2015/0364966 A1* | 12/2015 | Maihara | ................... | H02K 5/24 310/51 |
| 2016/0079817 A1* | 3/2016 | Hayashi | ................ | H02K 1/276 29/598 |
| 2016/0087493 A1* | 3/2016 | Kanakamedala | ........ | H02K 1/18 310/216.129 |
| 2016/0285324 A1* | 9/2016 | Carrasco | ................ | H02K 1/185 |
| 2016/0285342 A1* | 9/2016 | Carrasco | ............. | H02K 15/028 |
| 2017/0182587 A1* | 6/2017 | Tokoro | ................ | B23K 20/123 |
| 2017/0201135 A1* | 7/2017 | Kai | ........................ | H02K 3/18 |
| 2017/0313283 A1* | 11/2017 | Kojima | ................... | H02K 1/146 |
| 2018/0043420 A1* | 2/2018 | Handwerker | ........ | B23K 20/122 |
| 2018/0248439 A1* | 8/2018 | McGrew, Jr. | .......... | H02K 1/185 |
| 2018/0351435 A1* | 12/2018 | Takano | ................ | H02K 9/227 |
| 2019/0173334 A1* | 6/2019 | Takahashi | ............. | H02K 1/243 |
| 2022/0094233 A1* | 3/2022 | Seo | ........................ | H02K 3/522 |

* cited by examiner

MOTOR WITH SPLIT CORE STATOR WITH TWO SUPPORT RINGS

CROSS-REFERENCE TO RELATED APPLICATION

This application claims priority to and the benefit of Korean Patent Application No. 10-2020-0123237 filed in the Korean Intellectual Property Office on Sep. 23, 2020, the entire contents of which are incorporated herein by reference.

Technical Field

The present disclosure relates to a motor, and more particularly, to a motor capable of improving stability and reliability.

Background Art

A hybrid vehicle or an electric vehicle, which is called an environmentally friendly vehicle, generates driving power using an electric motor (hereinafter, referred to as a 'drive motor') that obtains rotational force from electrical energy.

In general, the drive motor includes a stator coupled to a housing, and a rotor rotatably disposed in the stator with a predetermined air gap from the stator.

The stator includes stator cores provided by stacking electrical steel sheets, and stator coils wound around slots of the stator cores.

The drive motors may be classified into a distributed winding drive motor and a concentrated winding drive motor depending on methods of winding the stator coil.

Unlike the distributed winding drive motor, the concentrated winding drive motor uses a split core stator. In this case, the split core stator has a plurality of divided split cores, stator coils are respectively wound around the split cores, and the divided split cores are fitted with (hot fitted with) a support ring.

Meanwhile, because the deformation of the split core degrades the electrical and mechanical performance of the motor, the deformation of and damage to the split core need to be minimized.

However, in the related art, when a force (i.e., a force for tightening the split cores in a radial direction) is excessively applied in the radial direction to the split cores at the time of fitting the support ring with outer circumferential surfaces of the split cores, the split core is deformed (e.g., swelled, twisted, or lifted) and damaged, which causes a problem of deterioration in electrical performance of the split core.

In addition, the position and posture of the split core need to be constantly and stably maintained to ensure the electrical and mechanical performance of the motor. However, in the related art, the support ring may merely support the outer circumferential surfaces of the split cores but hardly support upper and lower surfaces of the split cores in an axial direction of the stator. As a result, there is a problem in that it is difficult to uniformly maintain positions (heights) of the upper and lower surfaces of the split cores.

Therefore, recently, various studies have been conducted to minimize the deformation of and damage to the core and stably maintain the position and posture of the core, but the study results are still insufficient. Accordingly, there is a need to develop a technology to minimize the deformation of and damage to the core and stably maintain the position and posture of the core.

SUMMARY

The present disclosure has been made in an effort to provide a motor capable of improving stability and reliability.

In particular, the present disclosure has been made in an effort to minimize deformation of and damage to a core and stably maintain a position and posture (angle) of the core.

The present disclosure has also been made in an effort to inhibit incorrect assembly of a core and minimize a height (depth) tolerance of the core.

The present disclosure has also been made in an effort to simplify an assembly process and improve assembly properties.

The objects to be achieved by the embodiments are not limited to the above-mentioned objects, but also include objects or effects that may be understood from the solutions or embodiments described below.

An exemplary embodiment of the present disclosure provides a motor including: a stator including a plurality of split cores configured to cooperatively define a ring shape; and support rings configured to surround outer circumferential surfaces of the split cores and to support upper and lower surfaces of the split cores.

This is to improve the performance of cooling the motor and improve the stability and reliability.

That is, in the related art, when a force (i.e., a force for tightening the split cores in a radial direction) is excessively applied in the radial direction to the split cores at the time of fitting the support ring with outer circumferential surfaces of the split cores, the split core is deformed (e.g., swelled, twisted, or lifted) and damaged.

In addition, the position and posture of the split core need to be constantly and stably maintained to stably ensure the electrical and mechanical performance of the motor. However, in the related art, the support ring may merely support the outer circumferential surfaces of the split cores but hardly support upper and lower surfaces of the split cores in an axial direction of the stator. As a result, there is a problem in that it is difficult to uniformly maintain positions (heights) of the upper and lower surfaces of the split cores.

However, according to the embodiment of the present disclosure, the support rings surround the outer circumferential surfaces of the split cores and support the upper and lower surfaces of the split cores. Therefore, it is possible to obtain an advantageous effect of stably maintaining the position and posture (angle) of the split core.

Among other things, according to the embodiment of the present disclosure, the support rings support the upper and lower surfaces of the split cores. Therefore, it is possible to obtain an advantageous effect of uniformly maintaining the positions (heights) of the upper and lower surfaces of the split cores.

The support rings may have various structures capable of surrounding the outer circumferential surfaces of the plurality of split cores and supporting the upper and lower surfaces of the split cores.

For example, the support rings may include: an upper support ring configured to partially surround the outer circumferential surfaces of the split cores and to support the upper surfaces of the split cores; and a lower support ring configured to partially surround the outer circumferential surfaces of the split cores and to support the lower surfaces of the split core.

In particular, the motor may include a fastening member configured to fasten the upper support ring and the lower support ring.

As described above, the upper support ring and the lower support ring are disposed on upper and lower portions of the split cores, and the upper support ring and the lower support ring are fastened by the fastening member. Therefore, unlike the related art in which a support ring is fitted with split cores, it is possible to inhibit a force (i.e., a force for tightening the split core in the radial direction) from being excessively applied to the split core in the radial direction. As a result, it is possible to obtain an advantageous effect of minimizing the deformation of and damage to the split core.

In addition, according to the embodiment of the present disclosure, a process of hot fitting the support ring may be excluded. Therefore, it is possible to obtain an advantageous effect of simplifying the manufacturing process and reducing the manufacturing time.

The upper and lower support rings may have various structures in accordance with required conditions and design specifications.

In particular, the upper and lower support rings have the same structure (the same shape). Therefore, because a single mold may be used to manufacture the support rings including the upper and lower support rings, it is possible to obtain an advantageous effect of simplifying the manufacturing process and reducing the manufacturing costs.

According to the exemplary embodiment of the present disclosure, the upper support ring may include: a first upper support portion configured to support the upper surfaces of the split cores; a second upper support portion extending from the first upper support portion and configured to surround the outer circumferential surfaces of the split cores; and an upper flange portion protruding from an outer circumferential surface of the second upper support portion.

According to the exemplary embodiment of the present disclosure, the lower support ring may include: a first lower support portion configured to support the lower surfaces of the split cores; a second lower support portion extending from the first lower support portion and configured to surround the outer circumferential surfaces of the split cores; and a lower flange portion protruding from an outer circumferential surface of the second lower support portion and facing the upper flange portion.

The fastening member may fasten the upper support ring and the lower support ring in various ways.

For example, the fastening member may be configured to fasten the upper flange portion and the lower flange portion.

According to the exemplary embodiment of the present disclosure, the upper flange portion may include an upper fastening hole formed therein, the lower flange portion may include a lower fastening hole formed therein, and the fastening member may be fastened to the upper fastening hole and the lower fastening hole.

According to the exemplary embodiment of the present disclosure, a housing fastening hole may be provided in a housing that surrounds the support rings, and the fastening member may be fastened to the housing fastening hole.

As described above, the fastening member fastens all the upper support ring, the lower support ring, and the housing in the state in which the housing fastening hole is provided in the housing and the upper and lower support rings are disposed in the housing. Therefore, it is possible to obtain an advantageous effect of simplifying the process of assembling and fastening the support rings.

According to the exemplary embodiment of the present disclosure, the motor may include: guide grooves formed in the outer circumferential surfaces of the split cores and extending in an axial direction of the stator; first guide protrusions formed on an inner circumferential surface of the second upper support portion and circumferential surface of the second lower support portion and respectively accommodated in the guide grooves.

As described above, the guide grooves are formed in the split cores, the first guide protrusions are formed on the inner circumferential surface of the upper support ring, and the second guide protrusions are formed on the inner circumferential surface of the lower support ring. Therefore, it is possible to obtain an advantageous effect of stably maintaining the positions and postures of the upper and lower support rings relative to the split cores and inhibiting the rotations of the upper and lower support rings relative to the split cores.

According to the exemplary embodiment of the present disclosure, a gap may be disposed between the outer circumferential surfaces of the cores and the upper and lower support rings.

As described above, the gap is disposed between the outer circumferential surfaces of the cores and the upper and lower support rings. Therefore, even though the split cores are expanded (expanded in the radial direction) by heat (e.g., heat for curing varnish applied onto the cores), stress applied to the cores by the support rings may be minimized. Further, the split cores may be naturally contracted even though the split cores are cooled.

According to the exemplary embodiment of the present disclosure, the motor may include: fixing holes respectively formed in the upper and lower surfaces of the split cores; first fixing protrusions formed on an inner surface of the first upper support portion and accommodated in the fixing holes formed in the upper surfaces of the split cores; and second fixing protrusions formed on an inner surface of the first lower support portion and accommodated in the fixing holes formed in the lower surfaces of the split cores.

As described above, the fixing holes are provided in the split cores, the first fixing protrusions are formed on the first upper support portion, and the second fixing protrusions are formed on the first lower support portion. Therefore, it is possible to obtain an advantageous effect of more stably maintaining the arrangement state of the upper and lower support rings relative to the split core.

In addition, since the fixing holes are provided in the split cores, the first fixing protrusions are provided on the first upper support portion, and the second fixing protrusions are provided on the first lower support portion, it is possible to obtain an advantageous effect of minimizing the incorrect assembly of the upper and lower support rings.

DETAILED DESCRIPTION

Figure 1:
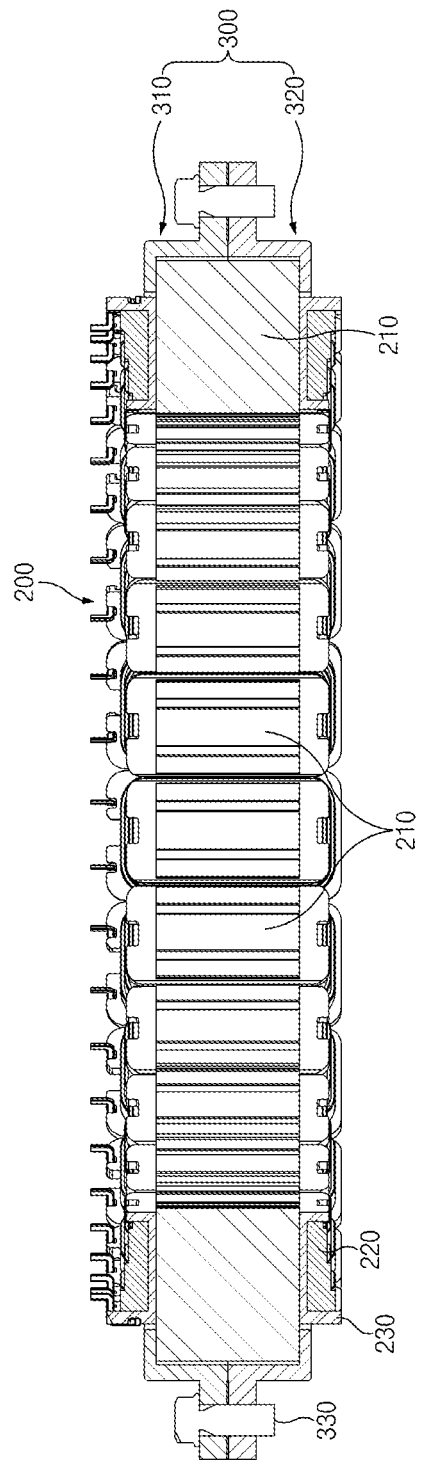
FIG. 1 is a view for explaining a motor according to an embodiment of the present disclosure.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 10, a motor 10 according to an embodiment of the present disclosure includes: a stator 200 including a plurality of split cores 210 configured to cooperatively define a ring shape; and support rings 300 configured to surround outer circumferential surfaces of the split cores 210 and configured to support upper and lower surfaces of the split cores 210.

For reference, the motor 10 according to the embodiment of the present disclosure may be used as a drive motor for a hybrid vehicle and/or an electric vehicle that is called an environmentally friendly vehicle and obtains driving power from electrical energy. The present disclosure is not restricted or limited by the type of the subject to which the motor 10 is applied.

For example, the motor 10 according to the embodiment of the present disclosure may be used as an inner-rotor-type synchronous motor. The motor 10 may include a stator coupling structure (not illustrated) disposed in a housing 100 and configured to support and fix the stator 200, and a rotor (not illustrated) rotatably installed in the stator 200 with a predetermined air gap from the stator 200.

According to another embodiment of the present disclosure, the stator may be mounted in the housing without a separate stator coupling structure. The present disclosure is not restricted or limited by the structure for mounting the stator.

Referring to FIG. 1, the housing 100 has a predetermined accommodation space therein, and the stator 200 is accommodated in the housing 100. For example, the housing 100 may be installed in a vehicle and seal the motor 10.

The housing 100 may have various shapes and structures each capable of accommodating the stator 200 therein. The present disclosure is not restricted or limited by the shape and structure of the housing 100.

The stator 200 includes the plurality of split cores 210 that cooperatively defines a ring shape. The stator 200 is disposed in the housing 100.

The split core 210 may be variously changed in number and structure in accordance with required conditions and design specifications. The present disclosure is not restricted or limited by the number of split cores 210 and the structure of the split core 210.

More specifically, the split core 210 may be configured by stacking a plurality of electrical steel sheets in an axial direction of the rotor.

A bobbin 230 (made of plastic, for example) is provided around each of the split cores 210, and a stator coil 220 is wound around the bobbin 230.

In particular, a coupling protrusion (not illustrated) may protrude in an axial direction on a lateral portion of any one of the adjacent split cores 210 (and have a semicircular cross-sectional shape, for example), and a coupling groove (not illustrated) for accommodating the coupling protrusion may be recessed in a lateral portion of the other of the adjacent split cores 210, thereby more stably supporting a state in which the split cores 210 are coupled to each other.

The support rings 300 surround the outer circumferential surfaces of the plurality of split cores 210 and support the upper and lower surfaces of the split cores 210.

As described above, according to the embodiment of the present disclosure, the support rings 300 surround the outer circumferential surfaces of the split cores 210 and support the upper and lower surfaces of the split cores 210. Therefore, it is possible to obtain an advantageous effect of stably maintaining the position and posture (angle) of the split core 210.

Among other things, according to the embodiment of the present disclosure, the support rings 300 support the upper and lower surfaces of the split cores 210. Therefore, it is possible to obtain an advantageous effect of uniformly maintaining the positions (heights) of the upper and lower surfaces of the split cores 210.

The support rings 300 may have various structures capable of surrounding the outer circumferential surfaces of the plurality of split cores 210 and supporting the upper and lower surfaces of the split cores 210. The present disclosure is not restricted or limited by the structures of the support rings 300.

For example, the support rings 300 may include an upper support ring 310 configured to partially surround the outer circumferential surfaces of the split cores 210 and support the upper surfaces of the split cores 210, and a lower support ring 320 configured to partially surround the outer circumferential surfaces of the split cores 210 and support the lower surfaces of the split cores 210.

In particular, the motor 10 may include a fastening member 330 configured to fasten the upper support ring 310 and the lower support ring 320.

As described above, the upper support ring 310 and the lower support ring 320 are disposed on upper and lower portions of the split cores 210, and the upper support ring 310 and the lower support ring 320 are fastened by the fastening member 330. Therefore, unlike the related art in which a support ring is fitted with split cores, it is possible to inhibit a force (i.e., a force for tightening the split core 210 in the radial direction) from being excessively applied to the split core 210 in the radial direction. As a result, it is possible to obtain an advantageous effect of preventing the split core 210 from being deformed (e.g., swelled, twisted, or lifted) and damaged.

In addition, according to the embodiment of the present disclosure, a process of hot fitting the support ring may be excluded. Therefore, it is possible to obtain an advantageous effect of simplifying the manufacturing process and reducing the manufacturing time.

The upper and lower support rings 310 and 320 may have various structures in accordance with required conditions and design specifications. The present disclosure is not restricted or limited by the structures of the upper and lower support rings 310 and 320.

In particular, the upper and lower support rings 310 and 320 have the same structure (the same shape). Therefore, because a single mold may be used to manufacture the support rings 300 including the upper and lower support rings 310 and 320, it is possible to obtain an advantageous effect of simplifying the manufacturing process and reducing the manufacturing costs.

According to the exemplary embodiment of the present disclosure, the upper support ring 310 may include a first upper support portion 312 configured to support the upper surfaces of the split cores 210, a second upper support portion 314 extending from the first upper support portion 312 and configured to surround the outer circumferential surfaces of the split cores 210, and an upper flange portion 316 protruding from an outer circumferential surface of the second upper support portion 314.

The first upper support portion 312 may be provided in the form of a hollow ring and cover upper edges of the split cores 210.

The second upper support portion 314 may be provided in the form of a hollow ring that surrounds upper ends of the outer circumferential surfaces of the split cores 210. The second upper support portion 314 may be integrally connected to an end (a right end based on FIG. 2) of the first upper support portion 312. For example, the first upper support portion 312 and the second upper support portion 314 may cooperatively define an approximately "L"-shaped cross-section.

The upper flange portion 316 may be variously changed in structure in accordance with required conditions and design specifications. For example, the upper flange portion 316 may be provided in plural, and the plurality of upper flange portions 316 may be disposed along the outer circumferential surface of the second upper support portion 314 and spaced apart from one another in a circumferential direction of the second upper support portion 314.

According to another embodiment of the present disclosure, the upper flange portion may be provided in the form of a continuous ring disposed in the circumferential direction of the second upper support portion.

According to the exemplary embodiment of the present disclosure, the lower support ring 320 may include a first lower support portion 322 configured to support the lower surfaces of the split cores 210, a second lower support portion 324 extending from the first lower support portion 322 and configured to surround the outer circumferential surfaces of the split cores 210, and a lower flange portion 326 protruding from an outer circumferential surface of the second lower support portion 324 and facing the upper flange portion 316.

The first lower support portion 322 may be provided in the form of a hollow ring and cover lower edges of the split cores 210.

The second lower support portion 324 may be provided in the form of a hollow ring that surrounds lower ends of the outer circumferential surfaces of the split cores 210.

The second lower support portion 324 may be integrally connected to an end (a right end based on FIG. 2) of the first lower support portion 322. For example, the first lower support portion 322 and the second lower support portion 324 may cooperatively define an approximately "L"-shaped cross-section.

The lower flange portion 326 may be variously changed in structure in accordance with required conditions and design specifications. For example, the lower flange portion 326 may be provided in plural, and the plurality of lower flange portions 326 may be disposed along the outer circumferential surface of the second lower support portion 324 and spaced apart from one another in a circumferential direction of the second lower support portion 324. The lower flange portion 326 may be disposed to face the upper flange portion 316.

According to another embodiment of the present disclosure, the lower flange portion may be provided in the form of a continuous ring disposed in the circumferential direction of the second lower support portion.

The fastening member 330 may fasten the upper support ring 310 and the lower support ring 320 in various ways. The present disclosure is not restricted or limited by the fastening structure and method of the fastening member 330.

For example, the fastening member 330 may be configured to fasten the upper flange portion 316 and the lower flange portion 326.

According to the exemplary embodiment of the present disclosure, an upper fastening hole 316a may be provided in the upper flange portion 316, and a lower fastening hole 326a may be provided in the lower flange portion 326. The fastening member 330 may be fastened (e.g., by screw fastening) to pass through the upper fastening hole 316a and the lower fastening hole 326a.

For reference, in the embodiment of the present disclosure, the example has been described in which the fastening member 330 fastens the upper flange portion 316 and the lower flange portion 326. However, according to another embodiment of the present disclosure, the fastening member may be fastened to any one of the first upper support portion, the second upper support portion, the first lower support portion, and the second lower support portion or fastened to other parts.

Figure 10:
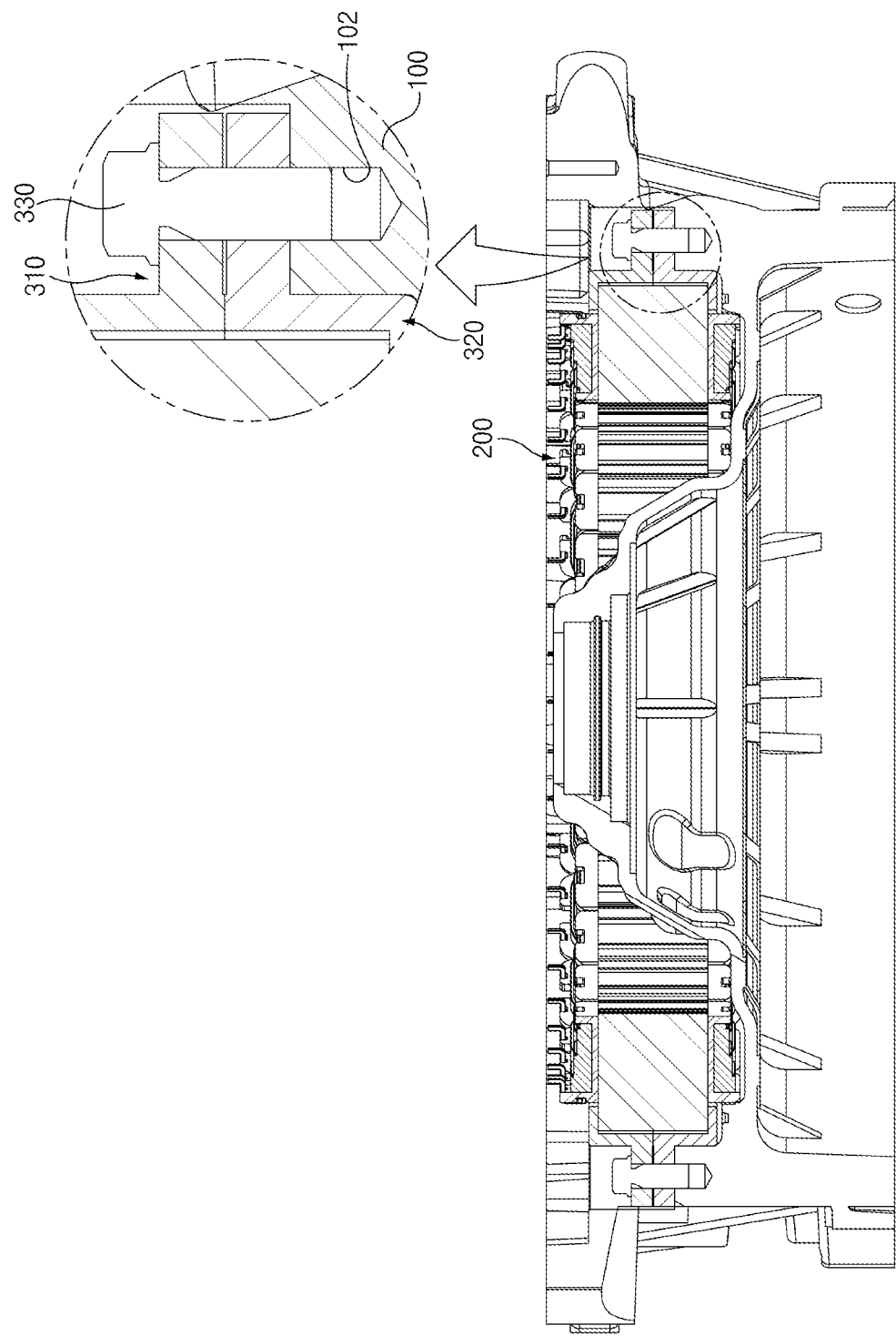
FIG. 10 is a view for explaining a housing of the motor according to the embodiment of the present disclosure.

Referring to FIG. 10, according to the exemplary embodiment of the present disclosure, a housing fastening hole 102 may be provided in the housing 100 that surrounds the support rings 300, and the fastening member 330 may be fastened to the housing fastening hole 102.

As described above, the fastening member 330 fastens all the upper support ring 310, the lower support ring 320, and the housing 100 in the state in which the housing fastening hole 102 is provided in the housing 100 and the upper and lower support rings 310 and 320 are disposed in the housing 100. Therefore, it is possible to obtain an advantageous effect of simplifying the process of assembling and fastening the support rings 300.

According to another embodiment of the present disclosure, the stator and the housing may be fastened by other members or structures.

Referring to FIGS. 3 to 8, according to the exemplary embodiment of the present disclosure, the motor 10 may include guide grooves 212 provided in the outer circumferential surfaces of the split cores 210 in the axial direction of the stator 200, first guide protrusions 314a provided on an inner circumferential surface of the second upper support portion 314 and accommodated in the guide grooves 212, and second guide protrusions 324a provided on an inner circumferential surface of the second lower support portion 324 and accommodated in the guide grooves 212.

The first and second guide protrusions 314a and 324a may have various structures capable of being accommodated in the guide grooves 212. The present disclosure is not restricted or limited by the shapes and structures of the first and second guide protrusions 314a and 324a.

In particular, the first and second guide protrusions 314a and 324a may each have a cross-section (e.g., a quadrangular cross-section) corresponding to a cross-section of the guide groove 212.

As described above, the guide grooves 212 are provided in the split cores 210, the first guide protrusions 314a are provided on the inner circumferential surface of the upper support ring 310, and the second guide protrusions 324a are provided on the inner circumferential surface of the lower support ring 320. Therefore, it is possible to obtain an advantageous effect of stably maintaining the positions and postures of the upper and lower support rings 310 and 320 relative to the split cores 210 and inhibiting the rotations of the upper and lower support rings 310 and 320 relative to the split cores 210.

For reference, in the embodiment of the present disclosure illustrated and described above, the example has been described in which the motor 10 includes the first guide protrusions 314a and the second guide protrusions 324a and all the first guide protrusions 314a and the second guide protrusions 324a are accommodated in the guide grooves 212. However, according to another embodiment of the present disclosure, the motor may have either the first guide protrusion or the second guide protrusion.

Figure 2:
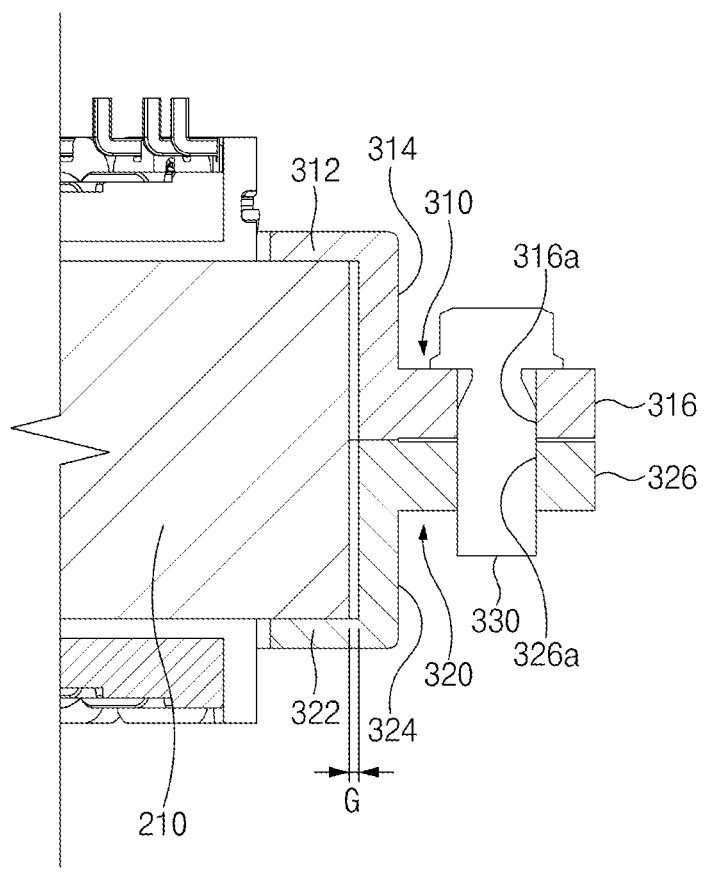
FIG. 2 is a view for explaining support rings of the motor according to the embodiment of the present disclosure.
Figure 3:
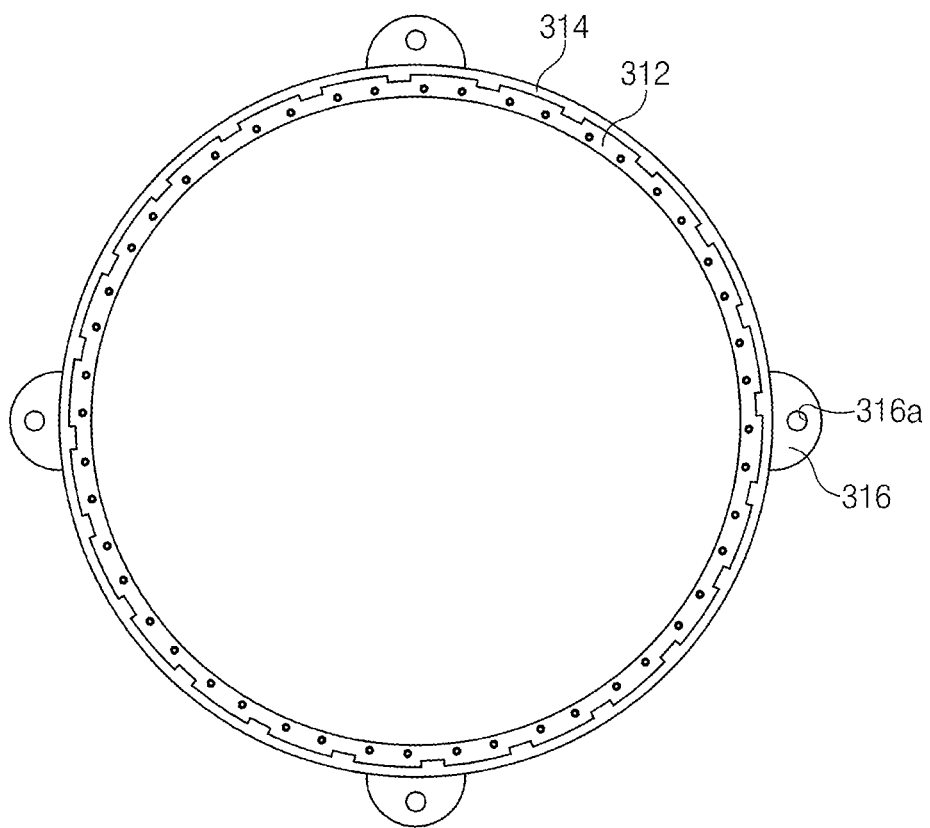
FIGS. 3 and 4 are views for explaining an upper support ring of the motor according to the embodiment of the present disclosure.
Figure 4:
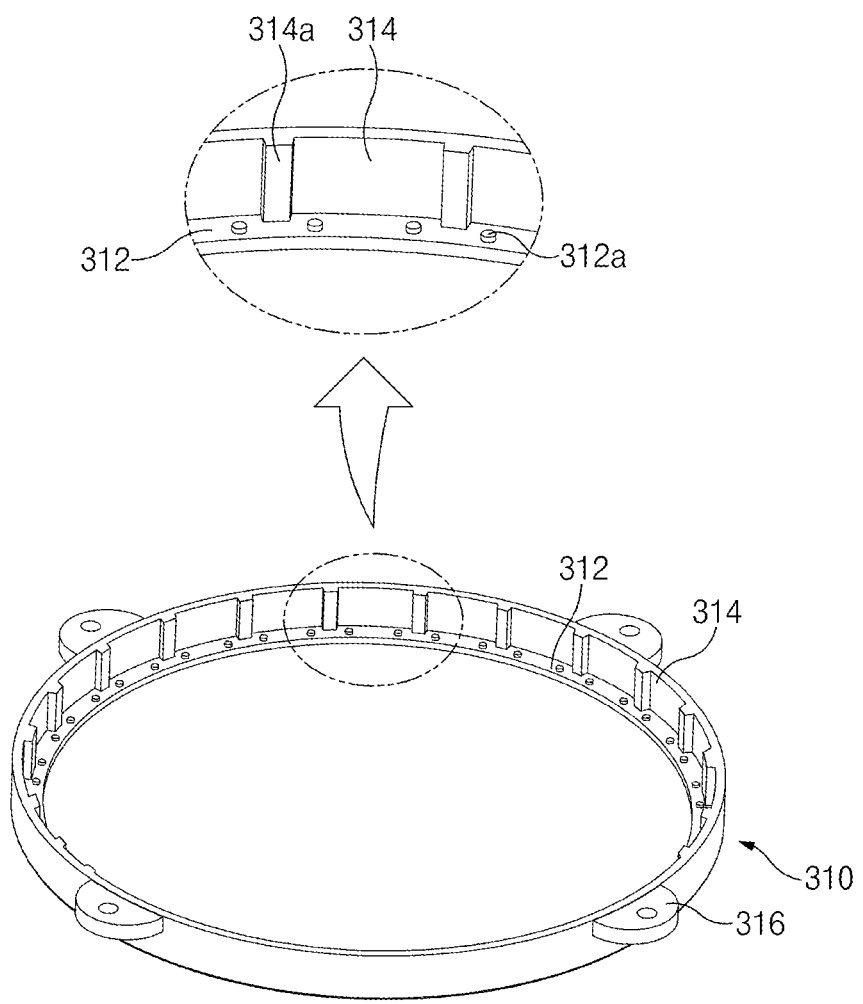
Figure 5:
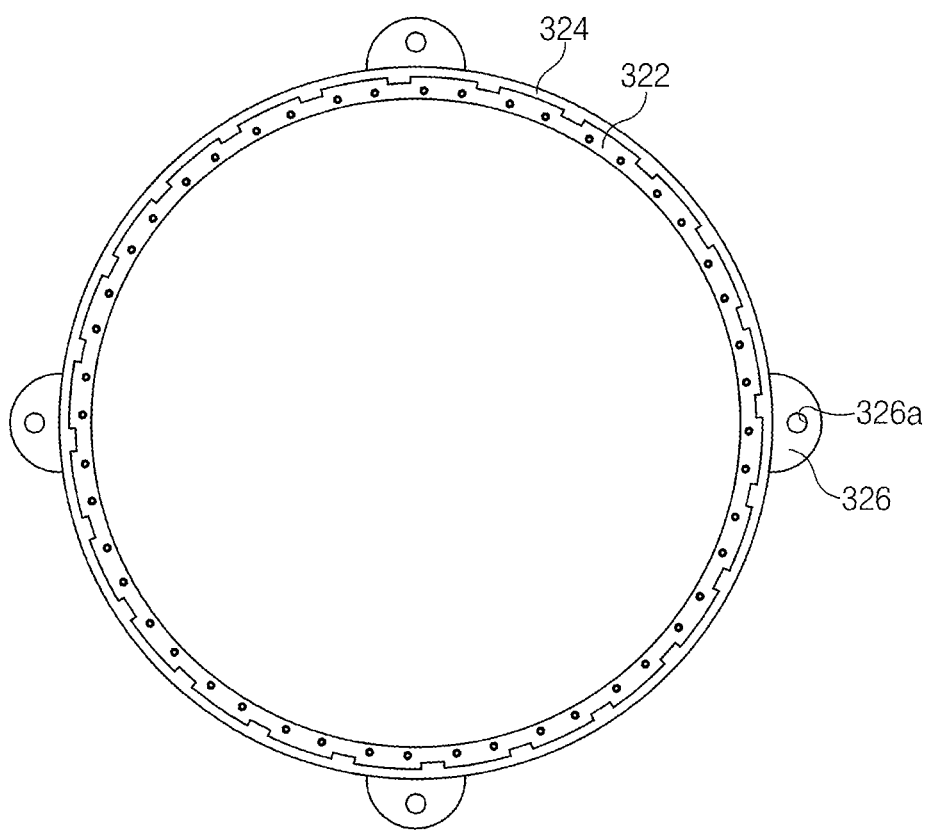
FIGS. 5 and 6 are views for explaining a lower support ring of the motor according to the embodiment of the present disclosure.
Figure 6:
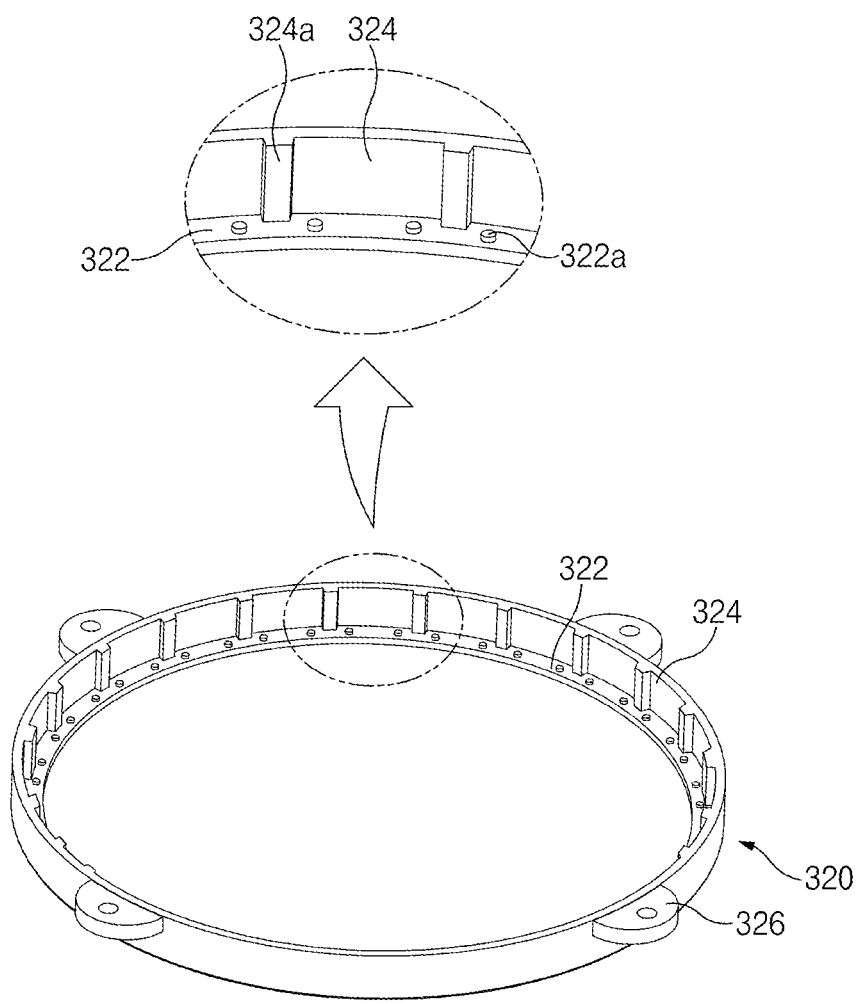
Figure 7:
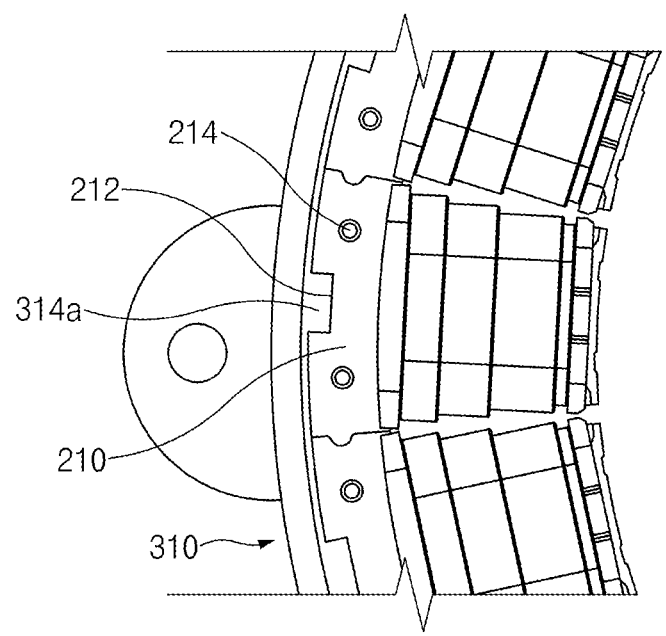
FIG. 7 is a view for explaining a guide groove of the motor according to the embodiment of the present disclosure.
Figure 8:
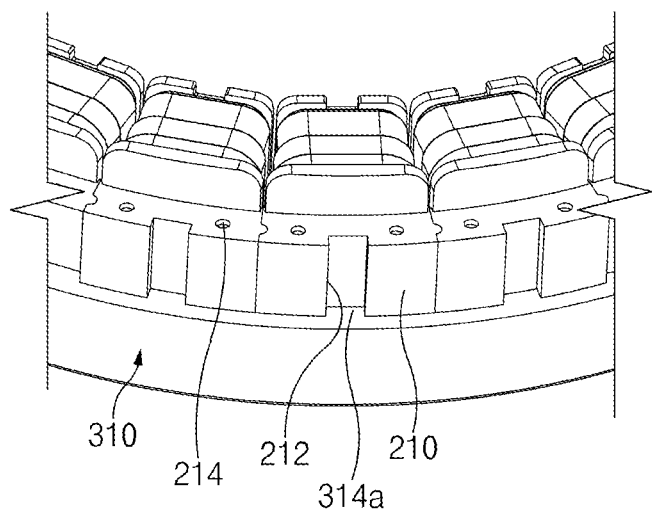
FIG. 8 is a view for explaining a fixing hole of the motor according to the embodiment of the present disclosure.

Referring to FIG. 2, according to the exemplary embodiment of the present disclosure, a gap G may be provided between the outer circumferential surfaces of the cores and the upper and lower support rings 310 and 320.

As described above, the gap is provided between the outer circumferential surfaces of the cores and the upper and lower support rings 310 and 320. Therefore, even though the split cores 210 are expanded (expanded in the radial direction) by heat (e.g., heat for curing varnish applied onto the cores), stress applied to the cores by the support rings 300 may be minimized. Further, the split cores 210 may be naturally contracted even though the split cores 210 are cooled.

The gap G may be variously changed in size in accordance with required conditions and design specifications. The present disclosure is not restricted or limited by the size of the gap G.

Referring to FIGS. 3 to 8, according to the exemplary embodiment of the present disclosure, the motor 10 may include fixing holes 214 respectively provided in the upper and lower surfaces of the split cores 210, first fixing protrusions 312a provided on an inner surface of the first upper support portion 312 and accommodated in the fixing holes 214 provided in the upper surfaces of the split cores 210, and second fixing protrusions 322a provided on an inner surface of the first lower support portion 322 and accommodated in the fixing holes 214 provided in the lower surfaces of the split cores 210.

As described above, the fixing holes 214 are provided in the split cores 210, the first fixing protrusions 312a are provided on the first upper support portion 312, and the second fixing protrusions 322a are provided on the first lower support portion 322. Therefore, it is possible to obtain an advantageous effect of more stably maintaining the arrangement state of the upper and lower support rings 310 and 320 relative to the split core 210.

In addition, since the fixing holes 214 are provided in the split cores 210, the first fixing protrusions 312a are provided on the first upper support portion 312, and the second fixing protrusions 322a are provided on the first lower support portion 322, it is possible to obtain an advantageous effect of minimizing the incorrect assembly of the upper and lower support rings 310 and 320.

That is, in a state in which the first and second fixing protrusions 312a and 322a are misaligned with the fixing holes 214 in a vertical direction, the first and second fixing protrusions 312a and 322a cannot be accurately inserted into the fixing holes 214, and the upper and lower support rings 310 and 320 are disposed and protrude with abnormal postures. Therefore, an operator may easily recognize whether the upper support ring 310 and the lower support ring 320 are incorrectly assembled.

The first and second fixing protrusions 312a and 322a may have various structures capable of being accommodated in the fixing holes 214. The present disclosure is not restricted or limited by the structures of the first and second fixing protrusions 312a and 322a.

For example, the first and second fixing protrusions 312a and 322a may each be provided in the form of a protrusion having a circular cross-section. The fixing hole 214 may be provided in the form of a circular hole corresponding to each of the first and second fixing protrusions 312a and 322a.

Figure 9:
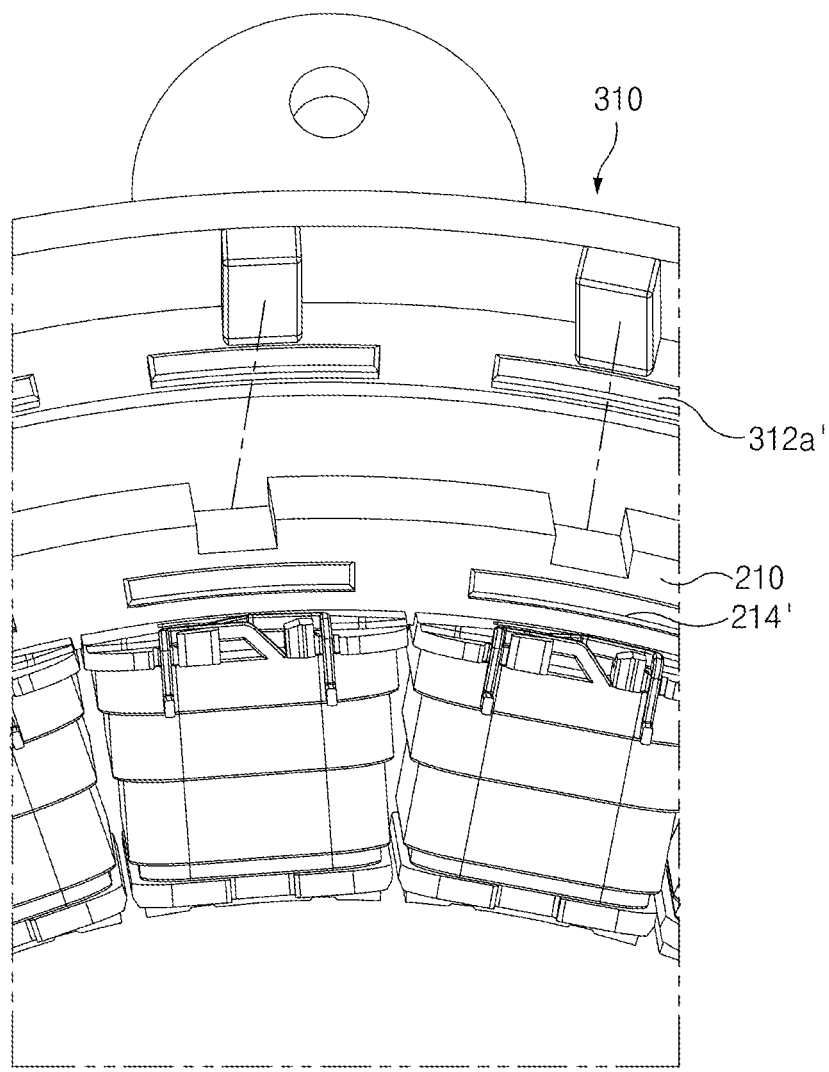
FIG. 9 is a view for explaining a modified example of the fixing hole of the motor according to the embodiment of the present disclosure.

As another example, referring to FIG. 9, a first fixing protrusion 312a' and a second fixing protrusion (not illustrated) may each be provided in the form of a protrusion having a quadrangular cross-section. A fixing hole 214' may be provided in the form of a quadrangular hole each corresponding to the first fixing protrusion 312a' and the second fixing protrusion.

According to the embodiment of the present disclosure as described above, it is possible to obtain an advantageous effect of improving stability and reliability.

In particular, according to the embodiment of the present disclosure, it is possible to obtain an advantageous effect of minimizing the deformation of and damage to the core and stably maintaining the position and posture (angle) of the core.

In addition, according to the embodiment of the present disclosure, it is possible to obtain an advantageous effect of inhibiting the incorrect assembly of the core and minimizing a height (depth) tolerance of the core.

In addition, according to the embodiment of the present disclosure, it is possible to obtain an advantageous effect of simplifying the assembly process and improving the assembly properties.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A motor comprising:
   a stator comprising a plurality of split cores configured to cooperatively define a ring shape, the stator further comprising a bobbin disposed around each of the split cores and a stator coil wound around the bobbin; and
   support rings configured to surround outer circumferential surfaces of the split cores and to support upper and lower surfaces of the split cores,
   wherein the support rings comprise:
      an upper support ring configured to partially surround the outer circumferential surfaces of the split cores and to support the upper surfaces of the split cores; and
      a lower support ring configured to partially surround the outer circumferential surfaces of the split cores and to support the lower surfaces of the split core, and
   wherein the upper support ring comprises:
      a first upper support portion configured to support the upper surfaces of the split cores;
      a second upper support portion extending from the first upper support portion and configured to surround the outer circumferential surfaces of the split cores; and
      an upper flange portion protruding from an outer circumferential surface of the second upper support portion,
   wherein the upper support ring has a first opening at a radially inner portion of the first upper support portion, and a portion of the bobbin extends above the first upper support portion through the first opening.

2. The motor of claim 1, wherein the upper support ring and the lower support ring have the same structure as each other.

3. The motor of claim 1, wherein a gap is disposed between the outer circumferential surfaces of the split cores and the upper and lower support rings.

4. The motor of claim 1, wherein
   the split cores include guide grooves formed in the outer circumferential surfaces thereof and extending in an axial direction of the stator, and
   at least one of the upper support ring or the lower support ring includes guide protrusions integrally formed on an inner circumferential surface of the at least one of the upper support ring or the lower support ring and respectively accommodated in the guide grooves.

5. The motor of claim 4, wherein the guide protrusions comprise:
   first guide protrusions formed on an inner circumferential surface of the second upper support portion and respectively accommodated in the guide grooves; and
   second guide protrusions formed on an inner circumferential surface of the second lower support portion and respectively accommodated in the guide grooves.

6. The motor of claim 4, wherein each of the guide grooves and the guide protrusions has a quadrangular cross-section.

7. The motor of claim 1, comprising:
   a fastening member configured to fasten the upper support ring and the lower support ring.

8. The motor of claim 7, wherein the lower support ring comprises:
   a first lower support portion configured to support the lower surfaces of the split cores;
   a second lower support portion extending from the first lower support portion and configured to surround the outer circumferential surfaces of the split cores; and
   a lower flange portion protruding from an outer circumferential surface of the second lower support portion and facing the upper flange portion.

9. The motor of claim 8, comprising:
   fixing holes respectively formed in the upper and lower surfaces of the split cores;
   first fixing protrusions formed on an inner surface of the first upper support portion and respectively accommodated in the fixing holes formed in the upper surfaces of the split cores; and
   second fixing protrusions formed on an inner surface of the first lower support portion and respectively accommodated in the fixing holes formed in the lower surfaces of the split cores.

10. The motor of claim 8, wherein the lower support ring has a second opening at a radially inner portion of the first lower support portion, and a portion of the bobbin extends below the first lower support portion through the second opening.

11. The motor of claim 8, wherein the fastening member fastens the upper flange portion and the lower flange portion.

12. The motor of claim 11, wherein:
   the upper flange portion includes an upper fastening hole formed therein; and
   the lower flange portion includes a lower fastening hole formed therein,
   wherein the fastening member is fastened to the upper fastening hole and the lower fastening hole.

13. The motor of claim 12, comprising:
   a housing configured to surround the support ring,
   wherein the housing has a housing fastening hole to which the fastening member is fastened.

* * * * *